United States Patent [19]

Haley

[11] Patent Number: 4,718,308
[45] Date of Patent: Jan. 12, 1988

[54] HYDRAULIC CONTROL SYSTEM FOR CONTINUOUSLY VARIABLE TRANSMISSION

[75] Inventor: William J. Haley, Ithaca, N.Y.
[73] Assignee: Borg-Warner Automotive, Inc., Troy, Mich.
[21] Appl. No.: 717,913
[22] Filed: Mar. 29, 1985
[51] Int. Cl.$^4$ ............................ B60K 41/12; B60K 41/18
[52] U.S. Cl. ................................ 74/866; 74/867; 474/28
[58] Field of Search .................... 74/865, 866, 867; 474/12, 18, 28

[56] References Cited

U.S. PATENT DOCUMENTS

| | | | |
|---|---|---|---|
| 3,115,049 | 2/1963 | Moan | 74/868 |
| 4,152,947 | 5/1979 | van Deurson et al. | 74/230.17 F |
| 4,458,318 | 7/1984 | Smit et al. | 474/12 X |
| 4,462,277 | 7/1984 | Miki et al. | 74/867 |
| 4,509,125 | 4/1985 | Fattic et al. | 474/11 X |
| 4,515,041 | 5/1985 | Frank et al. | 74/866 |
| 4,515,255 | 5/1985 | Haley et al. | 192/357 |
| 4,522,086 | 6/1985 | Haley | 474/18 X |
| 4,534,243 | 8/1985 | Yokoyama et al. | 74/867 X |
| 4,547,178 | 10/1985 | Hayakawa et al. | 74/867 X |
| 4,559,850 | 12/1985 | Sakakibara | 74/866 X |
| 4,610,183 | 9/1986 | Nobumoto et al. | 74/866 |

FOREIGN PATENT DOCUMENTS

814163 6/1937 France ............................ 74/867

*Primary Examiner*—Dirk Wright
*Attorney, Agent, or Firm*—James J. Jennings

[57] ABSTRACT

A control arrangement for a continuously variable transmission includes an electronic control system and a hydraulic control system. In the hydraulic control system three separate electromechanical control assemblies are used to regulate the pressure in the secondary sheave chamber (to hold the belt tension), the fluid flow to and from the primary sheave chamber (to regulate the CVT ratio), and to control the pressure in the apply line for the clutch chamber. The pump assembly of the hydraulic control system has a first output connection for providing fluid at line (high) pressure in the main line, and a second, low pressure output connection for providing fluid at a low pressure to satisfy the clutch cooling requirements. The high pressure and low pressure systems are essentially independent of each other.

8 Claims, 4 Drawing Figures

HYDRAULIC CONTROL SYSTEM FOR CONTINUOUSLY VARIABLE TRANSMISSION

BACKGROUND OF THE INVENTION

Various types of adjustable-diameter pulley transmissions have been developed and used. Often such transmissions take the form of two adjustable pulleys, each pulley having a sheave which is axially fixed and another sheave which is axially movable relative to the first sheave. A flexible belt of metal or elastomeric material is used to intercouple the pulleys. The interior faces of the pulley sheaves are beveled or chamfered so that, as the axially displaceable sheave is moved, the distance between the sheaves and thus the effective pulley diameter is adjusted. The displaceable sheave includes a fluid-constraining chamber for receiving fluid to move the sheave and thus change the effective pulley diameter; when fluid is exhausted from the chamber, the pulley diameter is changed in the opposite sense. Generally the effective diameter of one pulley is adjusted in one direction as the effective diameter of the second pulley is varied in the opposite direction, thereby effecting a change in the drive ratio between an input shaft coupled to the input pulley and an output shaft coupled to the output pulley. The ratio change is continuous as the pulley diameters are varied, and such a transmission is frequently termed a continuously variable transmission (CVT).

Various refinements were gradually evolved for the hydraulic control system which is used to pass fluid into the fluid-holding chamber of each adjustable pulley. One example of such a hydraulic control system is shown in U.S. Pat. No. 3,115,049—Moan. The patent shows control of the secondary pulley adjustable sheave, to regulate the belt tension, and a different circuit to regulate fluid into and out of the primary sheave chamber, to regulate the transmission ratio. U.S. Pat. No. 4,152,947—van Deursen et al also describes control of the CVT. In both systems the line pressure of the fluid applied to hold the belt tension by pressurizing the secondary chamber is relatively high. Thereafter an improved control system was developed to reduce the main line fluid pressure supplied to the secondary sheave chamber as a function of torque demand. This improved system is described and claimed in an application entitled "Control System for Continuously Variable Transmission", Ser. No. 257,035, filed Apr. 24, 1981, which issued June 11, 1985, as U.S. Pat. No. 4,522,086, and assigned to the assignee of this application. Further work resulted in an improved control system which not only reduced the line pressure applied to the secondary sheave chamber to a low, but safe, operating pressure, but also provided a lower control pressure for other portions of the hydraulic control system. This last system is described and claimed in an application entitled "Hydraulic Control System for Continuously Variable Transmission", Ser. No. 421,198, filed Sept. 22, 1982, and assigned to the assignee of this application, and now abandoned.

With the significant advances described in the cited applications, it is still desirable to improve the control of the CVT clutch. It is also desirable to improve the system response time and provide good line pressure control. Another goal is to speed up the power-off downshift in such a system.

SUMMARY OF THE INVENTION

A control system constructed in accordance with the present invention is particularly useful with a (CVT) having primary and secondary pulleys, with a belt intercoupling these pulleys. A chamber in the primary pulley admits and discharges fluid to change the effective pulley diameter and thus correspondingly change the transmission ratio. Similarly a chamber is provided in the secondary pulley for admitting and discharging fluid to maintain tension in the belt as the transmission is driven. The CVT includes a fluid-actuated clutch for transferring drive torque from the secondary pulley to the drivetrain. The clutch includes a chamber for receiving fluid to apply the clutch, and from which fluid is discharged to release the clutch. A main fluid line is connected to supply fluid under pressure to the secondary pulley chamber. A pump assembly is connected to supply fluid under pressure from a first output connection to the main fluid line. A first electromechanical control assembly is connected to regulate fluid pressure in the main line, and thus in the secondary pulley chamber. A second electromechanical control assembly is connected to regulate fluid flow from the main line to the primary pulley chamber, to control the transmission ratio.

In accordance with the present invention, a third electromechanical control assembly is connected to regulate the supply of fluid to, and discharge of fluid from, the clutch chamber.

In accordance with another aspect of the invention, the pump assembly includes a second output connection for supplying fluid at a low pressure to effect clutch cooling.

THE DRAWINGS

In the several figures of the drawings, like reference numerals identify like components, and in those drawings.

GENERAL SYSTEM DESCRIPTION

Figure 1:
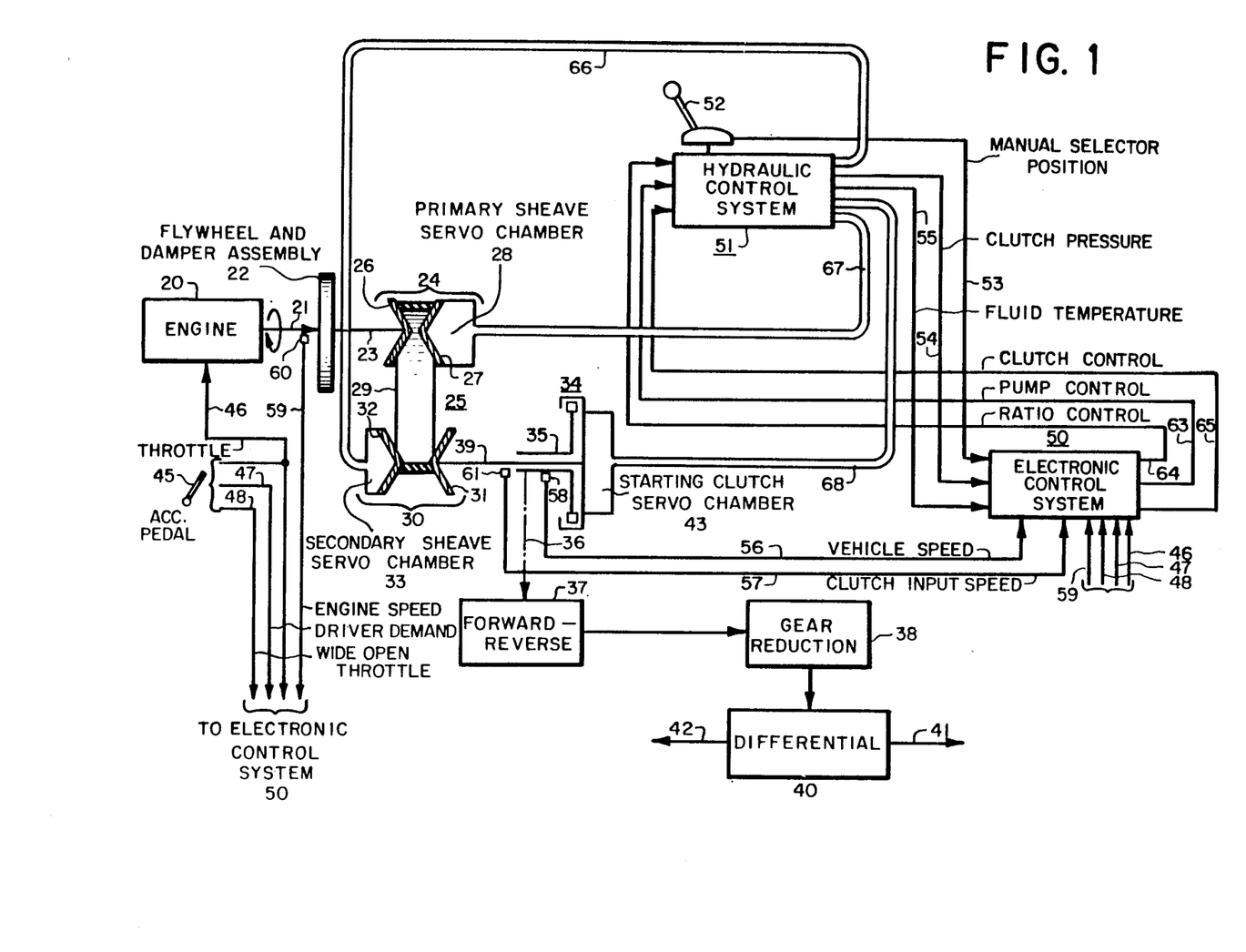
FIG. 1 is a block diagram showing the hydraulic control system of this invention and its relation to components of the continuously variable transmission.

FIG. 1 shows the general power flow in an automotive layout from an engine 20 over a shaft 21, flywheel-and-damper assembly 22 and transmission input shaft 23 to drive primary pulley 24 of a continuously variable transmission 25. Input or primary pulley 24 has a fixed sheave 26 and a movable sheave 27, with a primary sheave servo chamber 28 positioned to admit and discharge oil and thus adjust the position of movable sheave 27. Secondary or output pulley 30 has an axially fixed sheave 31 and an axially movable sheave 32, with a secondary sheave servo chamber 33 positioned to admit and discharge fluid to change the effective diameter of pulley 30. A belt 29 of metal or suitable elastomeric material intercouples pulleys 24 and 30. The output of secondary pulley 30 is supplied over shaft 39, in turn coupled to one side of clutch 34, the other side of which is coupled to a sleeve or quill shaft 35. Drive from this shaft is translated over a gear set (not shown)

represented by dash-dot line 36 to a forward-reverse gear selector assembly 37. Drive is passed from this selector assembly through a gear reduction stage 38 to a differential assembly 40, which passes output drive over shafts 41, 42 to the wheels (not shown) of the vehicle in which the control system of the invention is mounted. This drivetrain, from engine 20 to shafts 41,42 is completed when oil under pressure is admitted into starting clutch servo chamber 43.

Certain electrical signals are derived from the position of an accelerator pedal 45, and passed over a plurality of electrical conductors 46, 47 and 48 to an electronic control system 50. The throttle signal on line 46 is a function of the position of pedal 45. The driver demand signal on line 47 changes state as soon as pedal 45 is displaced from its at-rest position. The wide open throttle (WOT) signal on line 48 changes state when pedal 45 reaches the end of its travel. Electronic control system 50 operates jointly with a hydraulic control system 51 to regulate transmission operation and control engine operation.

A manual selector lever 52 shown adjacent hydraulic control system 51 operates to send a signal denoting the position of lever 52 over line 53 to electronic control system 50. Preferably the signal on line 53 is electronic but of course it can be mechanical or fluidic if desired. Another signal, indicating pressure in the clutch fluid line in hydraulic control system 51, is supplied over line 54 to the electronic control system 50. A signal representing the temperature of the transmission fluid is passed from hydraulic control system 51 over line 55 to electronic control system 50. Other input signals to the electronic control system are provided over conductors 56, 57 and 59. A conventional speed sensor 60 is located adjacent engine output shaft 21, to provide on line 59 a signal which varies as the engine speed. Because of the solid coupling through the flywheel-and-damper assembly to input pulley 24, the signal on line 59 can also be considered the transmission input speed. Another sensor 61 is positioned adjacent shaft 39, to provide on line 57 a clutch input speed signal. A third sensor 58 is positioned adjacent clutch output shaft 35, to provide on line 56 an output speed signal, denoting the speed of the transmission output shaft 39 when clutch 34 is engaged. This signal on line 56 can function as a vehicle speed signal, as there is no slip in the driveline beyond the clutch. Of course sensor 58 can be positioned anywhere between sleeve shaft 35 and drive shafts 41, 42 to provide the vehicle speed signal. After operating on these several input signals, electronic control system 50 provides three output control signals on lines 63, 64, and 65 for application to hydraulic control system 51. The signal on line 63 is a pump control signal to regulate the higher output pressure of a pump assembly within the hydraulic control system. The output signal on line 64 is a ratio control signal, used to establish the desired ratio of CVT 25. The third output signal, on line 65, is used to regulate operation of clutch 34. Hydraulic control system 51 passes fluid through conduit 66 to secondary sheave servo chamber 33, to hold the proper tension in belt 29. The hydraulic control system provides the appropriate fluid flow through line 67 to primary sheave servo chamber 28 to govern ratio changes, or maintain a steady ratio, of CVT 25. In addition, a third fluid signal through conduit 68 is provided to starting clutch servo chamber 43, to apply this clutch and complete the transfer of power through the drivetrain as described above, and to effect release of the clutch.

DETAILED DESCRIPTION OF THE INVENTION

Figure 2:
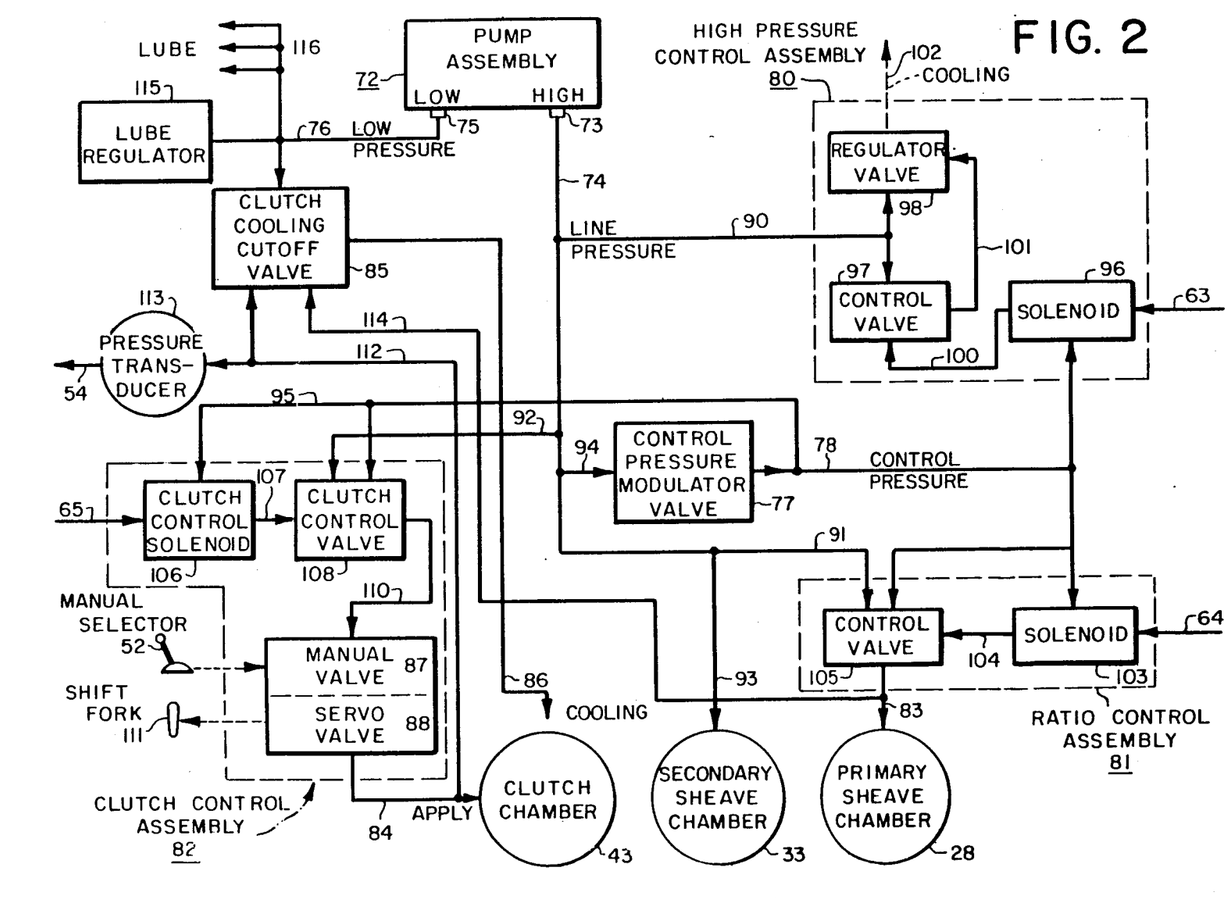
FIG. 2 is a block diagram depicting the relationship of major components in the hydraulic control system of this invention.

FIG. 2 depicts the major sub-systems of hydraulic control system 51 in block form. The various components are utilized to regulate pressure and flow of the fluid from a pump assembly 72 which, in the preferred embodiment, has a first output connection 73 for providing fluid at a relatively high pressure in main line 74, and a second output connection 75 for providing fluid at a pressure low with respect to that in line 74, in low pressure line 76. The high pressure flow is regulated to provide the appropriate fluid to and from clutch chamber 43, secondary sheave chamber 33, and primary sheave chamber 28. A third pressure is provided as a result of the operation of control pressure modulator valve 77, coupled between main line 74 and control pressure line 78, to provide a regulated pressure, in line 78 which, except for certain light throttle conditions, is substantially lower than that in main line 74. These individual lines and pressures are regulated by three electromechanical control assemblies 80, 81, and 82. These assemblies will be illustrated and described in more detail hereinafter in connection with FIGS. 3 and 4. For the present it is sufficient to note that high pressure control assembly 80 acts as a shunt regulator for the line pressure in main line 74, and is basically regulated by an electrical signal on line 63 (the pump control signal) from electronic control system 50. Ratio control assembly 81 receives the ratio control signal over line 64 from the electronic control system, and provides a regulated flow in line 83 to primary sheave chamber 28, and likewise is used to exhaust the fluid from that chamber when the ratio of the transmission is changed in the opposite direction. Clutch control assembly 82 receives an input electrical signal over line 65 from the electronic control system, and an output line 84 provides the fluid to regulate the application and release of clutch 34 by providing fluid into and out of clutch chamber 43. This provision of a separate control assembly 82 to regulate the slipping clutch of this sytem is an important improvement of the present control system. Likewise a clutch cooling cutoff valve 85 is provided between low pressure line 76 and line 86 through which the cooling fluid is applied to the clutch. This is another important advantage of the present invention, in that the cooling fluid is derived from low pressure line 76 and is entirely independent in its operation from the high pressure portions of the system.

Before considering the general operation of the system, it is emphasized that pump assembly 72 can comprise two separate, independent pumps for providing a high or line pressure in line 74 and a substantially lower pressure in line 76. In the preferred embodiment of this invention, the pump assembly was a unitary assembly of a three-gear pump, described and claimed in a patent application entitled "Offset Three-Gear, Two-System Pump", filed Nov. 26, 1984, having Ser. No. 674,890, and assigned to the assignee of this application. A control pressure modulator valve such as that designated 77 in FIG. 2 is illustrated and described in the above-identified, application having Ser. No. 421,198, filed Sept. 22, 1982, now abandoned. The combination of a manual valve 87 and servo valve 88, as shown in the lower portion of clutch control assembly 82, is described and claimed in an application entitled "Hydraulic Control System for a Transmission", filed Aug. 6, 1982, having Ser. No. 405,797, which issued May 7, 1985, as U.S. Pat.

No. 4,515,255 and assigned to the assignee of this application. The teachings of these applications are incorporated herein by reference, and there will be no detailed description of the structure or operation of the vaious components described in detail in these several references.

A good understanding of the mechanical layout and function of a variable pulley transmission of a type suitable for control by the system of this invention is set out in U.S. Pat. No. 4,433,594, which issued Feb. 28, 1984 and is assigned to the assignee of this application. Likewise a suitable electronic control system implementation for such an arrangement is taught in U.S. Pat. No. 4,458,318, which issued July 3, 1984.

In FIG. 2, high pressure line 74 carries fluid from pump assembly 72 over line 90 to high pressure control assembly 80, over line 91 to ratio control assembly 81, and over line 92 to clutch control assembly 82. In addition the high pressure fluid is applied through line 93 to secondary sheave chamber 33, and over line 94 to the input side of control pressure modulator valve 77. The output side of this valve provides a controlled, lower pressure through line 78 to high pressure control assembly 80, ration control assembly 81, and over line 95 to clutch control assembly 82. Thus the controlled low pressure, which is very helpful in a system where solenoids or other electromechanical units are employed, is applied to each of the control assemblies 80, 81 and 82 of this arrangement.

High pressure control assembly 80 includes a solenoid 96, a control valve 97, and a regulator valve 98. Solenoid 96 can be any suitable solenoid, and at present it is preferred to use a three-way solenoid of the type which receives input fluid over line 78, and discharges fluid through a port (not shown) to exhaust as a function of the control signal on line 63. A two-way solenoid can also be employed, but more fluid is discharged to sump in such an arrangement and thus the three-way solenoid is preferred for this system. Accordingly a fluid output signal is provided on line 100 which is at a pressure lower than that in line 78, by a percentage determined by the duty cycle of the pulse width modulated signal on line 63. This signal on line 100 is effectively amplified in control valve 97, to provide a higher pressure signal on line 101 to regulator valve 98. These valves cooperate as will be explained hereinafter to regulate the pressure on line 90, and thus in main line 74, thereby regulating the pressure in secondary sheave chamber 28 to the appropriate level to hold the tension in the belt-pulley system of the CVT. If desired a cooling arrangement can be connected as represented by the dashed line 102, to cool the transmission.

Ratio control assembly 81 likewise includes a solenoid 103 connected to receive an input fluid at a controlled pressure over line 78, and to provide an output fluid signal on line 104 to control valve 105. The level of the fluid control signal on line 104 is a function of the duty cycle, or percentage of "on" time, of the pwm signal on line 64. The result is a fluid flow over line 83 to primary sheave chamber 28, or the exhaust of fluid from the chamber 28, as a result of the signal on line 64 and the cooperation of the solenoid and control valve in the ratio control assembly.

Clutch control assembly 82 includes a solenoid 106, like the other solenoids 96 and 103, for receiving fluid at a control pressure level over line 95 and providing an output fluid signal on line 107 as a function of the duty cycle of the input signal on line 65. The output signal of the solenoid on line 107 is passed to clutch control valve 108, which receives line pressure over line 92 and the control pressure over line 95. The output of clutch control valve 108 is passed over line 110 to manual valve 87 and, depending upon the relative positions of manual selector 52 and shift fork 111, through servo valve 88 and line 84 to clutch chamber 43. The pressure level signal on line 84 is fed back through line 112 to clutch cooling cutoff valve 85, and to a pressure transducer 113. The pressure transducer provides an electrical signal over line 54 to electronic control system 50 as described generally in connection with FIG. 1. Another fluid signal, from the primary sheave chamber 28 in FIG. 2, is fed back over line 114 to clutch cooling cutoff valve 85.

It is thus evident that the high pressure output side of pump assembly 72 supplies line pressure for use by each of the three electromechanical control assemblies 80, 81 and 82 in the regulation of the tension in the belt-pulley system, the ratio of the CVT, and the control of the clutch 34. The low pressure in line 76 is applied to clutch cooling cutoff valve 85, for applying the cooling to the clutch when this valve is in the appropriate position. This low pressure is also passed to a lubrication (lube) regulator valve 115, which in turn regulates the pressure in line 76 for application of lubricating fluid as represented generally by the arrows 116. The use of the lubrication regulator valve and the lubricating connections are well known in the art and will not be further described.

Figure 3:
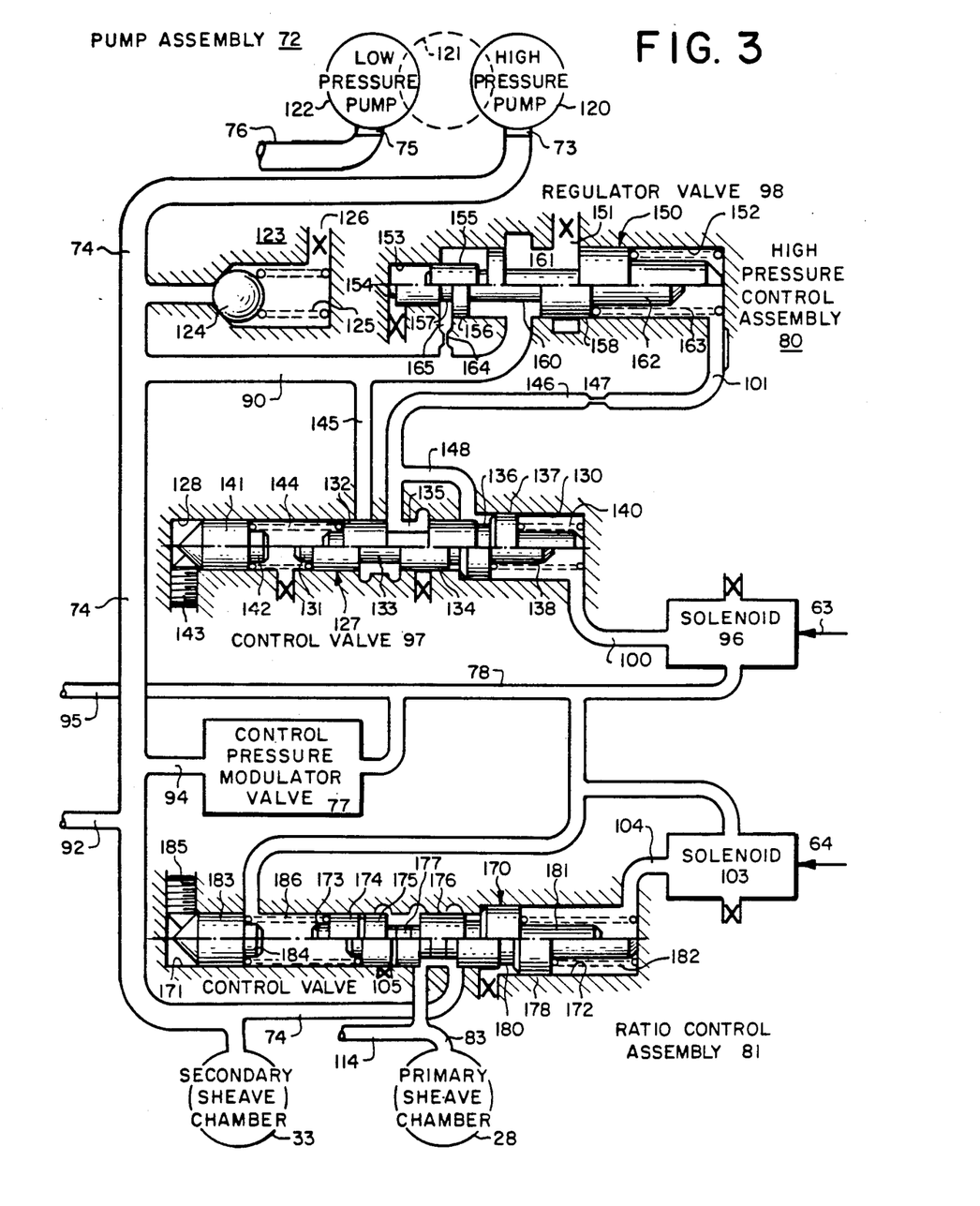
FIGS. 3 and 4 are schematic diagrams depicting details of various system components shown more generally in FIG. 2.

FIG. 3 depicts the valve details of the high pressure control assembly 80, and of the ratio control assembly 81. In addition pump assembly 72 is shown as a three-gear pump in which the gears are generally referenced 120, 121, and 122. As mentioned above, this pump assembly can be of the type shown and described in the copending application having Ser. No. 674,890. Also shown in FIG. 3 is a pressure relief valve 123, having a simple ball 124 restrained on its seat by a spring 125. The other side of this valve is connected through a port 126 to sump. The x indicates a connection to sump throughout the valve showings. If the pressure in line 74 exceeds the safety setting represented by the force of spring 125, ball 124 is forced off its seat and the pressure is relieved through port 126 to sump.

In one embodiment of the invention which was built and satisfactorily tested, the high pressure in main line 74 was set at 260 psi, and the low pressure in line 76 at 20 psi. The intermediate or control line pressure provided by modulator valve 77 in lines 78 and 95 was set at 60 psi. These pressure levels are given by way of example only and in no sense by way of limitation. They will however enable those skilled in the art to suitably modify the depicted valve arrangements and other components to provide any desirable pressure levels and changes in system operation required by different engines and transmissions.

Considering first high pressure control assembly 80, control valve 97 includes a spool assembly 127 received in a bore having a first portion of given diameter 128, and a second, larger-diameter portion 130. From left to right spool assembly 127 includes a stem 131, a first land 132, a reduced-diameter portion 133 connecting land 132 with a second land 134, with a channel 135 being defined between the lands 132 and 134, and another reduced section 136 connecting a land 137 to land 134. Land 137 is of larger diameter than lands 132 and 134, and another stem 138 extends from the larger land 137 into the large bore portion 130 of the valve assembly. A bias spring 140 encircles stem 138, being restrained between land 137 and the end wall of the valve assembly.

At the left side of control valve 97 is an end plug 141, which includes a short stem extension 142. A set screw 143 is provided as shown, with the tapered portion abutting the correspondingly tapered nose of plug 141. A second bias spring 144 is provided as shown, with one end encircling stem 142 of the end plug and the other end encircling stem 131 and abutting land 132 of the spool assembly. Spool assembly 127 is shown in its two extreme positions above and below the center line of the valve. In the upper position the force of spring 144 has displaced valve spool 127 to its extreme right position, effectively blocking the fluid in main line 90 and connecting line 145, and in the lower position, at the extreme left fluid is passed from line 90 through line 145, through the channel 135, and back through line 146, orifice 147 and line 101 to the right end of regulator valve 98. There is also a feedback from line 146, through line 148 to the groove adjacent reduced-diameter channel 136 as shown. In general however the valve will not be in either of these extreme positions but in normal operation is situated in approximately its mid position, between the extremes illustrated. Valve 97 functions as an amplifier, to increase the fluid pressure in line 100 received from solenoid 96, which can be in the range of approximately 15 to 50 psi to a higher level pressure for application to regulator valve 98. In its regulating position, the forces urging spool assembly 127 to the right include the bias force of spring 144 and the product of the fluid pressure received in line 148 times the effective face area of land 137. The opposing forces in valve 97 include the bias force of spring 140, augmented by the product of the larger-area land 137 and the fluid pressure in line 100 received from solenoid 96.

Regulator valve 98 includes a spool assembly 150 positioned to regulate the amount of fluid in main line connection 90 which is passed through port 151 to sump, thus providing shunt regulation of the pressure in main line 74. Valve spool assembly 150 is received in a first bore portion 152 and a second, reduced-diameter bore portion 153. From left to right the spool assembly includes a small nose portion 154, a first land 155, a second land 156 which is of larger diameter than land 155 and connected thereto by a segment 157, another land portion 158 connected by a reduced-diameter portion 160 to land 156 to define a groove 161, and a stem portion 162 connected to land 158. A bias spring 163 is positioned to encircle the stem 162, bearing against the outer portion of land 158 and the end wall of regulator valve 98. Spool assembly 150 is urged to the left by bias spring 163 and the force of the fluid in line 101 applied to the face area of land 158. There is a feedback of the pressure in line 90 through orifice 164 and input channel 165 to bear against the exposed portion of land 156, urging spool assembly 150 to the right as shown in FIG. 3. The balance of these forces determines the proportion of the fluid in line 90 which is passed through port 151 to sump. This is also the port to which the cooler will be connected, in the event it is desirable to use a cooler with the associated transmission.

Turning now to ratio control assembly 81, solenoid 103 provides a controlled fluid pressure through line 104 to one end of control valve 105, and the regulated control pressure in line 78 is applied to the other end. Control valve 105 includes a spool assembly 170 positioned in a bore having a first, given diameter portion 171 and a second, larger-diameter portion 172. From left to right spool assembly 170 includes a stem portion 173, a first land 174 in bore portion 171, a second land 175 connected to land 174 by a reduced-diameter portion, another land 176 connected to land 175 by reduced-diameter portion 177, and another, larger-diameter land 178 connected over portion 180 to land 176. A stem 181 extends from land 178 toward the right end of the bore. A bias spring 182 is positioned around stem 181, between land 178 and the end wall of the bore.

At the left end of the spool assembly 170 is an end plug 183, having a stem portion 184. A set screw 185 is provided in the valve body as shown, so that adjustment of the set screw effectively sets the position of plug 183. Another bias spring 186 is provided, encircling stem 184 and abutting plug 183, with its other end encircling stem 173 of spool assembly 170.

Unlike pressure control valve 97, control valve 105 is a flow control valve. That is, the position of spool assembly 170 is adjusted to regulate the amount of flow from line 74 which is passed through line 83 to primary sheave chamber 28. The forces urging spool assembly 170 to the right include the bias force of spring 186, with the product of the pressure from control line 78 times the area of land 174. At the right end of the valve the forces urging the spool assembly to the left include that of bias spring 182, augmented by the force of the pressure in line 104 multiplied by the area of land 178, which is larger than the area of land 174. Accordingly the variable pressure in line 104 is effective to regulate the position of spool assembly 170, either passing flow through line 83 to fill primary sheave chamber 28 and displace the movable sheave in one direction, or "dump" the fluid in line 83 to sump to displace the movable sheave in the opposite direction and thereby regulate the ratio change in the CVT.

Figure 4:
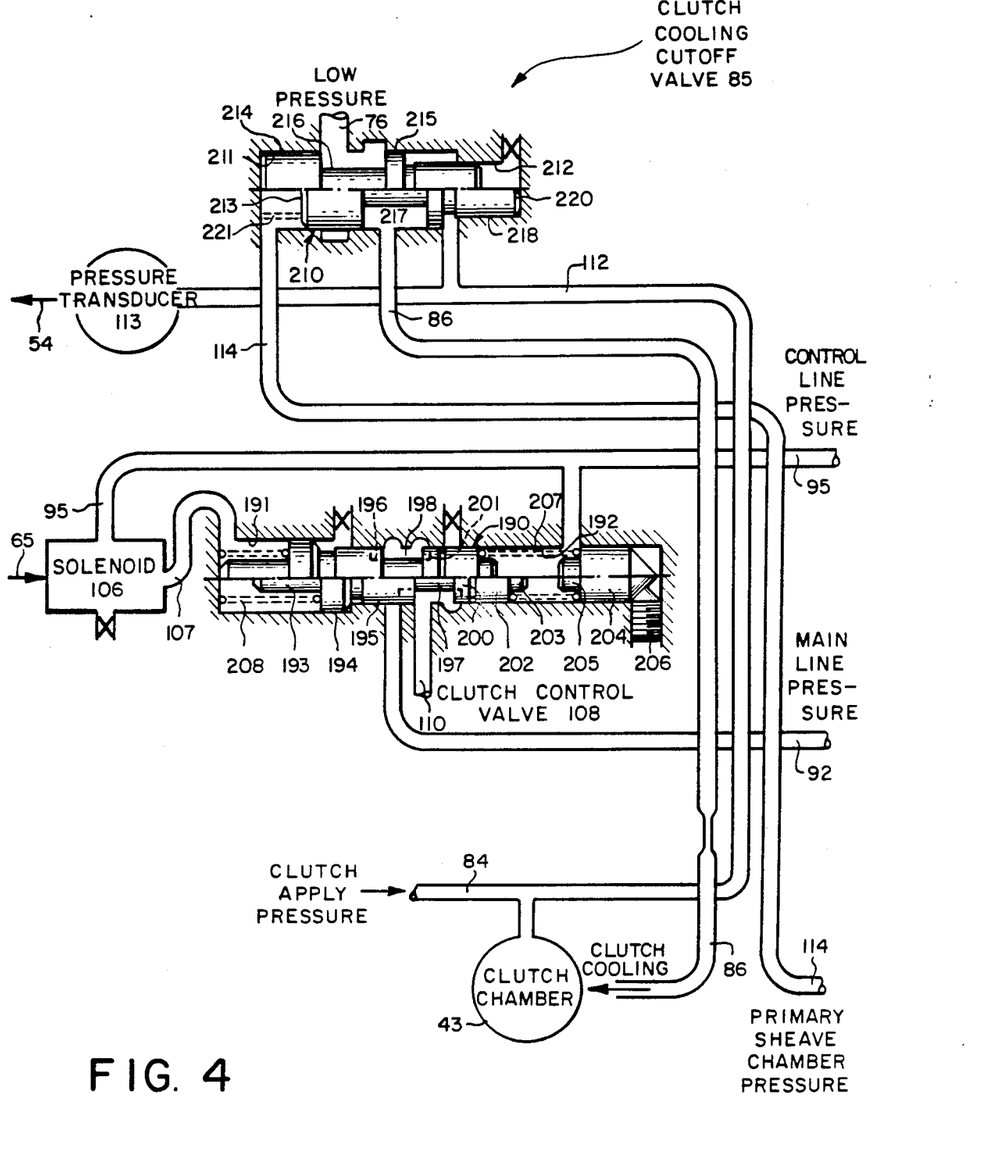

Considering now FIG. 4, the manual valve 87 and servo valve 88 are not depicted or described because of their explicit teaching in the above-identified copending application. Clutch control solenoid 106 and its associated clutch control valve 108 are shown, for receiving an input clutch control signal over line 65 and cooperating to regulate the pressure in line 110 of the fluid passed to manual valve 87.

In more detail, clutch control valve 108 includes a spool assembly 190 positioned within a first bore portion 191 and a second bore portion 192, with the diameter of portion 192 being smaller than that bore segment 191. From left to right spool assembly 190 includes a stem portion 193, a first land portion 194, positioned within larger bore 191, another land 195 in the reduced bore diameter 192, with a series of channels 196 cut in the portion of land 195 abutting the adjacent reduced diameter portion 197 and the resulting channel 198. The next land portion 200 also has a similar series of channels 201 cut in the indicated portion, and land 202 is connected by a reduced diameter portion to land 200. A stem 203 extends from land 202.

In the right end of bore 192 is an end plug 204, having a stem portion 205. An adjustable set screw 206 is threaded into a correspondingly tapped portion adjacent the end wall of the bore as shown. A spring 207 is positioned so that its left end is inserted over stem 203 to abut land 202, and its right end encircles stem 205 to abut the end plug 204. Thus adjustment of set screw 206 is effective to set the initial bias force of spring 207. At the other end of the spool assembly a second bias spring 208 encircles stem 193, abutting land 194 and restrained at its other end by the left end wall of bore 191.

Clutch control valve 108 generally controls about its center position, regulating the proportion of the pressure in main line connection 92 that is passed through its output line 110 to manual valve 87. The slotted portions 196 in land 194, and the corresponding slotted orifices 201 in land 200, can be considered as variable orifices which regulate the flow from the main line pressure to sump. The mid point, or common connection of these two orifices, passes flow to line 110. The forces urging spool assembly 190 to the right include the force of bias spring 208 and the pressure of the fluid in line 107 from clutch control solenoid 106 bearing against the large area land 194. To urge the spool assembly in the opposite direction, the force of bias spring 192 is augmented by the pressure in line 95 multiplied by the face area of land 202.

Clutch cooling cutoff valve 85 includes a spool assembly 210 positioned in a bore having a first, large diameter portion 211 and a second, smaller diameter portion 212. From left to right the spool assembly includes a short stem portion 213, a first land 214 received in bore 211, a second land 215 of the same diameter as land 214 and connected to land 214 by a reduced diameter portion 216 to define a channel 217. A smaller diameter land 218 is received in bore portion 212, and connected by a reduced diameter segment to land 215. A short stem 220 is provided at the right end of land 218. A bias spring 221 is positioned between stem portion 213 and the left end wall of bore 211. This spring normally urges spool assembly 210 to the right, as shown in the lower portion of the valve, to prevent flow from low pressure input channel 76 through output line 86 to effect clutch cooling.

When the system begins to operate to control movement of a vehicle including a CVT by engaging the clutch, pressure for applying the clutch is provided in line 84 and passed to clutch chamber 43. This pressure signal is fed back through line 112 to the reduced diameter portion between lands 215 and 218 of cutoff valve 85 as shown. The differential pressure against the larger land 215 urges spool assembly 210 to the left, against the force of spring 221, allowing flow of the fluid from line 76 through valve 85 and line 86 to effect clutch cooling. After the vehicle is moving and has just started to call for ratio change, the start of pressure rise in primary sheave chamber 28 is fed back through line 114 to the left end of spool assembly 210. This pressure in effect displaces the spool assembly to its right position, blocking the flow of cooling fluid as it is not needed when the clutch is not slipping.

An important advantage of the present invention is that the clutch cooling fluid is provided completely independently of the high pressure line used for the three electromechanical assemblies that regulate the control functions. The low pressure line for cooling the clutch can be though of as completely independent of the high pressure line and the other components shown in FIG. 3. There are in effect two signals fed back from the high pressure side, that of the clutch apply pressure through line 112 to the cooling cutoff valve, and the primary sheave chamber pressure through line 114 to the other end of the same valve 85. In all other respects the low pressure and the high pressure portions of the control system run by the two different output connections of the pump assembly 72 are completely independent.

TECHNICAL ADVANTAGES

The control system of the present invention, with the described gear pump and shunt regulator control assembly 80, provides for fast response of the system and thus better control of the CVT clutch. In addition good pressure control of the line is expected, even at low operating temperatures.

By separating the hydraulic circuit of the clutch control from that of the secondary sheave chamber, the clutch can be released much more rapidly even while the secondary shift pressure is increased, resulting in a fast power-off downshift. These are significant advantages which have not been achieved with any of the earlier hydraulic control systems used in connection with continuously variable transmissions.

In the appended claims the term "connected" (when used in an electrical or electronic sense) means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alternations as may fall within the true spirit and scope of the invention.

What is claimed is:

1. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, a fluid-actuated clutch operable to transfer drive torque from the secondary pulley to an associated drivetrain, which clutch includes a chamber for receiving fluid to apply the clutch and from which fluid is discharged to release the clutch, a main line connected directly to the secondary pulley fluid chamber so that fluid at line pressure is always supplied to the secondary pulley fluid chamber a pump assembly connected to supply fluid under pressure from a first output connection to said main line, a first electromechanical control assembly having an input fluid connection coupled to said main line and an output fluid connection coupled to said clutch and chamber, a second electromechanical control assembly, having an input fluid connection coupled to said main line and an output fluid connection coupled to said primary pulley chamber, and a third electromechanical control assembly coupled to said main line, and means for supplying three electrical control signals, respectively applied to said electromechanical control assemblies, to individually regulate application and release of said clutch, the transmission ratio, and fluid pressure in said main line.

2. A control system as claimed in claim 1, in which said clutch is a fluid-cooled clutch and said pump assembly includes a second output connection for supplying fluid at a pressure substantially lower than the fluid pressure in said main line, and a clutch cooling cutoff valve, coupled between the pump assembly second output connection and the fluid-cooled clutch, for regulating the flow of cooling fluid to the clutch.

3. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, a fluid-actuated clutch operable to transfer drive torque from the secondary pulley to an associated drivetrain, which clutch includes a chamber for receiving fluid to apply the clutch and from which fluid is discharged to release the clutch, a main line connected to supply fluid under pressure to the secondary pulley fluid chamber, a pump assembly connected to supply fluid under pressure from a first output connection to said main line, three electromechanical control assemblies, two of which have an input fluid connection coupled to said main line and which also have an output fluid connection respectively coupled to said clutch and primary pulley chamber, the third of said electromechanical control assemblies being coupled to said main line, means for supplying three electrical control signals, respectively applied to said electromechanical control assemblies, to individually regulate application and release of said clutch, the transmission ratio, and fluid pressure in said main line, and further comprising a control line, means including a modulator valve coupled to said main line for establishing in said control line a fluid pressure which is regulated to be substantially constant and lower than the main line fluid pressure, and means coupling said control line to each of said electromechanical control assemblies for applying fluid at the pressure in said control line to each of said assemblies.

4. A control system as claimed in claim 2, in which said pump assembly is a three-gear pump for supplying both the fluid at a first pressure in said main line, and the fluid at a pressure substantially lower than the main line fluid pressure to said clutch cooling cutoff valve.

5. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, a fluid-actuated, fluid-cooled clutch operable to transfer drive torque from the secondary pulley to an associated drivetrain, which clutch includes a chamber for receiving fluid to apply the clutch and from which fluid is discharged to release the clutch, a main line connected to supply fluid under line pressure to the secondary pulley fluid chamber, a pump assembly connected to supply fluid at a first pressure from a first output connection to said main line, three electromechanical control assemblies, two of which have an input fluid connection coupled to said main line and which also have an output fluid connection respectively coupled to said clutch and primary pulley chambers, the third of said electromechanical control assemblies being coupled to said main line, means including an electronic control system for supplying three electrical control signals, respectively applied to said electromechanical control assemblies, to individually regulate application and release of said clutch, the transmission ratio, and fluid pressure in said main line, said pump assembly including a second output connection for supplying fluid at a second pressure substantially lower than the first fluid pressure in said main line, and a clutch cooling cutoff valve, coupled between the pump assembly second output connection and the fluid-cooled clutch, for regulating the flow of cooling fluid to the clutch.

6. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, a fluid-actuated, fluid-cooled clutch operable to transfer drive torque from the secondary pulley to an associated drivetrain, which clutch includes a chamber for receiving fluid to apply the clutch and from which fluid is discharged to release the clutch, a main line connected to supply fluid under line pressure to the secondary pulley fluid chamber, a pump assembly connected to supply fluid at a first pressure from a first output connection to said main line, three electromechanical control assemblies, two of which have an input fluid connection coupled to said main line and which also have an output fluid connection respectively coupled to said clutch and primary pulley chambers, means coupling the third of said electromechanical control assemblies to the main line, means including an electronic control system for supplying three electrical control signals, respectively applied to said electromechanical control assemblies, to individually regulate application and release of said clutch, the transmission ratio, and fluid pressure in said main line, said pump assembly including a second output connection for supplying fluid at a second pressure substantially lower than the first fluid pressure, a clutch cooling cutoff valve, coupled between the pump assembly second output connection and the fluid-cooled clutch, for regulating the flow of cooling fluid to the clutch, in which the electromechanical control assemblies coupled to the main line comprise a high pressure system essentially independent of the clutch cooling cutoff valve coupled to the pump assembly second output connection for providing a low pressure solely for clutch cooling, a first feedback connection from the clutch chamber to the clutch cooling cutoff valve to urge the valve into a position to provide clutch cooling when the clutch is applied, and a second feedback connection from the primary pulley chamber to the clutch cooling cutoff valve to urge the valve into a position to prevent clutch cooling when the transmission is in overdrive ratio.

7. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, a fluid-actuated clutch operable to transfer drive torque from the secondary pulley to an associated drivetrain, which clutch includes a chamber for receiving fluid to apply the clutch and from which fluid is discharged to release the clutch, a main line connected to supply fluid under pressure to the secondary pulley fluid chamber, a pump assembly connected to supply fluid under pressure from a first output connection to said main line, three electromechanical control assemblies, two of which have an input fluid connection coupled to said main line and which also have an output fluid connection respectively coupled to said clutch and primary pulley chambers, means coupling the third of said electromechanical control assemblies to the main line, means for supplying three electrical control signals, respectively applied to said electromechanical control assemblies, to individually regulate application and release of said clutch, the transmission ratio, and fluid pressure in said main line, and further comprising a control line, means including a modulator valve coupled to said main line for establishing in said control line a fluid pressure which is regulated to be substantially constant and lower than the main line fluid pressure, and means coupling said control line to each of said electromechanical control assemblies for applying fluid at the pressure in said control line to each of said assemblies.

8. A control system as claimed in claim 5, in which said pump assembly is a three-gear pump for supplying both the fluid at a first pressure in said main line, and the fluid at a pressure substantially lower than the main line fluid pressure to said clutch cooling cutoff valve.

* * * * *